United States Patent [19]

Matsui et al.

[11] Patent Number: 4,468,238
[45] Date of Patent: Aug. 28, 1984

[54] PROCESS FOR REMOVING A NITROGEN GAS FROM MIXTURE COMPRISING $N_2$ AND CO OR $N_2'$ $CO_2$ AND CO

[75] Inventors: Sigeo Matsui, Hyogo; Yogo Tukahara; Shigeki Hayashi, both of Shiga; Masahiko Kumagai, Osaka, all of Japan

[73] Assignees: Osaka Oxygen Industries Ltd., Osaka; Kawasaki Steel Corporation, Hyogo, both of Japan

[21] Appl. No.: 517,272

[22] Filed: Jul. 26, 1983

[30] Foreign Application Priority Data

Jul. 27, 1982 [JP] Japan .................. 57-130899

[51] Int. Cl.$^3$ .............................................. B01D 53/04
[52] U.S. Cl. .......................................... 55/26; 55/58; 55/62; 55/68
[58] Field of Search ............... 55/25, 26, 58, 62, 68, 55/75

[56] References Cited

U.S. PATENT DOCUMENTS

| | | | |
|---|---|---|---|
| 3,176,444 | 4/1965 | Kiyonaga | 55/62 X |
| 3,338,030 | 8/1967 | Feldbauer, Jr. | 55/62 X |
| 3,430,418 | 3/1969 | Wagner | 55/62 X |
| 3,564,816 | 2/1971 | Batta | 55/62 X |
| 3,636,679 | 1/1972 | Batta | 55/62 X |
| 3,788,037 | 1/1974 | Shell et al. | 55/58 |
| 3,923,477 | 12/1975 | Armond et al. | 55/25 |
| 3,986,849 | 10/1976 | Fuderer et al. | 55/25 |
| 4,019,879 | 4/1977 | Rabo et al. | 55/68 |
| 4,019,880 | 4/1977 | Rabo et al. | 55/68 |
| 4,077,779 | 3/1978 | Sircar et al. | 55/68 X |
| 4,129,424 | 12/1978 | Armond | 55/25 |
| 4,315,759 | 2/1982 | Benkmann | 55/62 X |

Primary Examiner—Robert H. Spitzer
Attorney, Agent, or Firm—Browdy and Neimark

[57] ABSTRACT

Processes for removing $N_2$ from a feed gas comprising $CO+N_2$ or CO, $CO_2+N_2$ through PSA by using at least two adsorption columns containing an adsorbent exhibiting selective adsorb property to carbon monoxide which comprises:

(i) a step of pressurizing an adsorption column by the feed gas;

(ii) a step of introducing the feed gas into the adsorption column, in which step (i) was previously completed, so as to adsorb CO, or $CO+CO_2$ on or in the adsorbent;

(iii) a step of connecting the adsorption column, in which step (ii) was previously completed, to the other adsorption column in which step (v) was previously completed, to reduce the pressure in the former adsorption column to one atmosphere or a pressure close to it;

(iv) a step of purging nitrogen by passing product gas through the adsorption column;

(v) a step of desorbing carbon monoxide adsorbed on or in the adsorbent of the adsorption column, by vacuum pump to recover a product gas; and (vi) a step of a connecting the adsorption column, in which step (v) was previously completed, to the other adsorption column in which step (ii) was previously completed to increase pressure in the former column, periodically switching the flow between or among said adsorption columns so as to repeat the above steps in all the adsorption columns.

12 Claims, 1 Drawing Figure

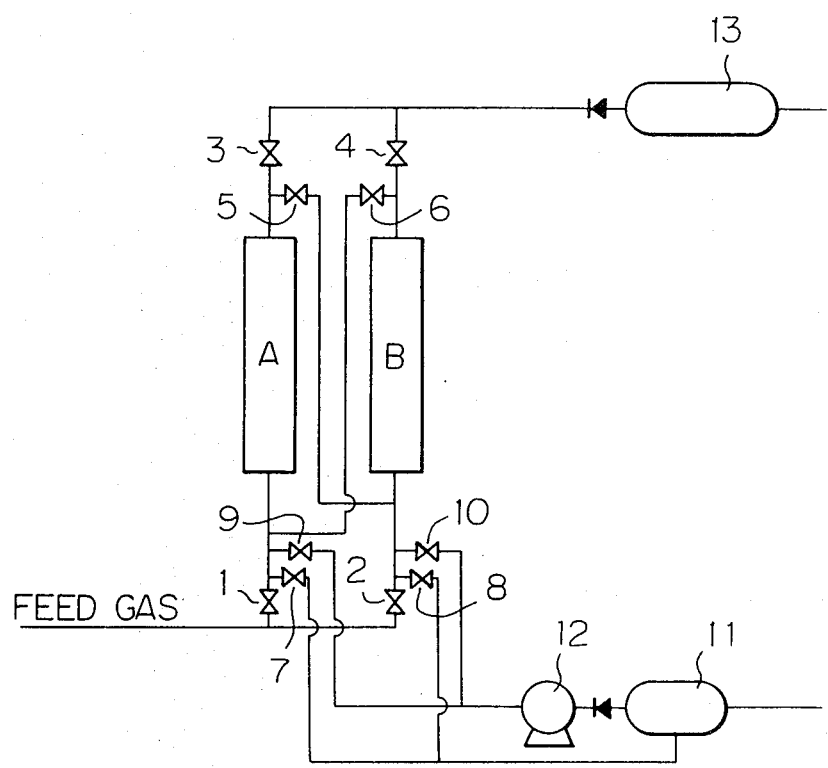

4,468,238

PROCESS FOR REMOVING A NITROGEN GAS FROM MIXTURE COMPRISING $N_2$ AND CO OR $N_2'$ $CO_2$ AND CO

BACKGROUND OF THE INVENTION

This invention relates to a process for separating CO or $CO+CO_2$ from mixture comprising $N_2$ and CO, or $N_2$, $CO_2$ and CO by pressure swing adsorption (PSA), and particularly relates to a process for removing a nitrogen gas from exhaust gas of blast furnace or converter furnace by PSA.

In general, exhaust gases from blast furnace and converter furnace comprise the following components:

|  | CO | $H_2$ | $CO_2$ | $N_2$ | $O_2$ |
|---|---|---|---|---|---|
| Exhaust gas from blast furnace | 23.0 | 3.0 | 20.0 | 54.0 | 0 |
| Exhaust gas from converter furnace | 66.0 | 2.0 | 16.0 | 15.9 | 0.1 |
| (percent by volume) | | | | | |

Since these exhaust gases contain a relatively considerable amount of carbon monoxide, these gases were used as a reducing agent or a combustion gas for blast furnace or converter furnace by circulating these gases into blast furnace or converter furnace.

However, these gases contain large amount of nitrogen with carbon monoxide. When these gases are used as a combustion gas in these furnace, nitrogen suppresses the combustion of carbon monoxide in these furnace. Therefore, when these exhaust gases are used as a combustion gas, it is desirable to remove nitrogen from these gases.

When gaseous mixture containing two or more gaseous components passes through a column containing an adsorbent, the adsorbent exhibits selective adsorption property to specific component in the mixture. Therefore, separation of one component from a mixture containing two or more components is made possible by using an adsorbent by PSA. There are many patents and patent applications relating to processes for separating poorly adsorbable component from a poorly adsorbable component and easily adsorbable component-containing mixture by PSA. For example, oxygen has been separated from air containing oxygen (poorly adsorbable component) and nitrogen (easily adsorbable component) by PSA in the prior.

However, adsorbents being capable of selectively adsorbing nitrogen from a mixture of nitrogen and carbon monoxide have not been prepared. Therefore, process for separating easily adsorbable component from a mixture of easily adsorbable component and poorly adsorbable component by PSA have not been developed. For example, it has been thought in the prior art that it is impossible to separate CO or $CO+CO_2$ from exhaust gases of blast furnace or converter furnace.

SUMMARY OF THE INVENTION

An object of this invention is to provide for separating easily adsorbable component (CO, etc.) from a mixture of easily adsorbable component (CO, etc.) and poorly adsorbable component ($N_2$) by PSA.

This invention relates to a process for separating carbon monoxide from a feed gas comprising carbon monoxide and nitrogen through PSA by using at least two adsorption columns containing an adsorbent exhibiting selective adsorb property to carbon monoxide which comprises:

(i) a step of pressurizing an adsorption column by the feed gas, in which the step (vi) was previously completed;

(ii) a step of introducing the feed gas into the adsorption column, in which step (i) was previously completed, so as to adsorb carbon monoxide on or in the adsorbent until the breakthrough point is reached or until just before that point is reached;

(iii) a step of connecting the adsorption column, in which step (ii) was previously completed, to the other adsorption column in which step (v) was previously completed, to reduce the pressure in the former adsorption column to one atmosphere or a pressure close to it, and the increase pressure in the latter adsorption column;

(iv) a step of purging nitrogen by concurrently passing product gas through the adsorption column, in which step (iii) was previously completed;

(v) a step of desorbing carbon monoxide adsorbed on or in the adsorbent of the adsorption column, in which step (iv) was previously completed, by vacuum pump to recover a product gas, and (vi) a step of connecting the adsorption column, in which step (v) was previously completed, to the other adsorption column, in which step (ii) was previously completed to increase pressure in the former column, periodically switching the flow between or among said adsorption columns so as to repeat the above steps in all the adsorption columns.

This invention also relates to a process for separating carbon monoxide, carbon dioxide from a feed gas comprising carbon monoxide, carbon dioxide and nitrogen through PSA by using at least two adsorption columns containing an adsorbent exhibiting selective adsorb property to carbon monoxide which comprises:

(i) a step of pressurizing an adsorption column by the feed gas, in which the step (vi) was previously completed;

(ii) a step of introducing the feed gas into the adsorption column, in which step (i) was previously completed, so as to adsorb carbon monoxide and carbon dioxide adsorbed on or in the adsorbent until the breakthrough point is reached or until just before that point is reached;

(iii) a step of connecting the adsorption column, in which step (ii) was previously completed, to the other adsorption column in which step (v) was previously completed, to reduce the pressure in the former adsorption column to one atmosphere or a pressure close to it, and to increase pressure in the latter column;

(iv) a step of purging nitrogen by concurrently passing product gas through the adsorption column, in which step (iii) was previously completed;

(v) a step of desorbing carbon monoxide and carbon dioxide on the adsorbent of the adsorption column, in which step (iv) was previously completed, by vacuum pump to recover a product gas, and (vi) a step of connecting the adsorption column, in which step (v) was previously completed, to the other adsorption column, in which step (ii) was previously completed to increase pressure in the former zone, periodically switching the flow between or among said adsorption zones so as to repeat the above steps in all the adsorption zones.

BRIEF EXPLANATION OF THE DRAWING

FIG. 1 is a flow sheet of the apparatus of this invention.

DETAILED DESCRIPTION OF THE INVENTION

By the term "Nl" in the specification is meant liter in normal state.

The adsorbents employed in the practice of this invention include natural or synthetic zeolites, molecular sieves, activated carbon and the like. Mordenite, a type of zeolite and adsorbent obtained by grind mordenite type zeolite, followed by sintering the reformed zeolite with a binding agent are preferable.

Step (i)

In this step, a feed gas is introduced into an adsorption column to increase pressure in the column. Since gas to be recovered according to this invention is easily adsorbable component, too high adsorption pressure is unnecessary. In general the adsorption pressure of as low as 3 $Kg/cm^2 \cdot G$ is sufficient. The adsorption pressure of less than 3 $Kg/cm^2 \cdot G$ can also be used. However, adsorption pressure of more than 3 $Kg/cm^2 \cdot G$ may be used.

Step (ii)

Adsorption step is continued until the breakthrough point is reached or until just before that point is reached.

Step (iii)

The adsorption column, in which step (ii) was previously completed, is connected to the other adsorption column, in which step (v) is previously completed to withdraw the gas component from the former column and introduce it into the latter column, thereby reducing the pressure in the former adsorption column to one atmosphere or a pressure close to it.

Step (iv)

Product gas is passed through the adsorption column, in which step (iii) was previously completed, to purge poorly adsorbable component nitrogen. It is preferable that the pressure in this step is lower than the adsorption pressure and is higher than one atmosphere. In general, it may be unnecessary to use pump; and the step may be carried out by connecting the adsorption column to storage tank for product gas. Preferably the product gas is concurrently passed through the column.

Step (v)

The adsorption column, in which step (iv) was previously completed, may be evacuated to 30-60 Torr by vacuum pump to recover product gas, CO or CO+ $CO_2$. Preferably, the evacuation is countercurrently carried out.

Step (vi)

The adsorption column, in which step (v) was previously completed, is connected to the other adsorption column, in which step (ii) was previously completed, to pressurize the former column by introducing gas from the latter column to the former column. Preferably, introduction of the gas is concurrently carried out. This step is continued until the pressure in the latter column is reduced to one atmosphere or a pressure close to it. In end of this step, the pressure in the former column is less than one atmosphere.

The present invention is explained by typical embodiment, but not limit the scope of this invention, in which CO is recovered from exhaust gas of converter furnace.

FIG. 1 shows a flow sheet of apparatus for removing poorly adsorbable component, $N_2$ from exhaust gas of converter furnace to recover easily adsorbable component, CO by PSA.

Adsorption columns A and B contain adsorbent being capable of selectively adsorbing easily adsorbable component, CO.

In case of starting the apparatus, adsorption columns A and B are evacuated to 30 Torr, preferably to 60 Torr by vacuum pump. A feed gas is introduced by opening valve 1. In this step, valves 2, 3, 4, 5, 6, 7, 8, 9 and 10 are all closed. During this step, adsorption column B is kept vacuum. After the pressure in column A raises to 0.1-3.0 $Kg/cm^2 \cdot G$, preferably 0.5-2.0 $Kg/cm^2 \cdot G$, valve 3 is opened to keep this pressure. During this step, poorly adsorbable component, $N_2$ is held in gas holder 13. After adsorption step is completed, valves 1 and 3 are closed and valve 5 is opened, whereby gas transfer from column A to column B is carried out so as to reduce the pressure in column A to one atmosphere or a pressure close to it. Then valves 3 and 7 are opened, and product gas is passed through column A while keeping the pressure in column A at a pressure higher than one atmosphere and lower than the adsorption pressure, thereby purging poorly adsorbable component, $N_2$ remaining in void of the adsorbent. After a predetermined amount of product gas is used in this purging step, or purging step is carried out for a predetermined period, valve 7 is closed. Then valve 9 is opened and valves 3 and 7 are closed, and column A is evacuated to 30 Torr, preferably 60 Torr by vacuum pump to recover easily adsorbable component, CO from the adsorbent. The flow are periodically switched between columns A and B, whereby PSA operation is continuously carried out.

This invention is further illustrated by the following Examples, but not limit the scope.

EXAMPLE 1

This example shows separation of CO from converter exhaust gas having the following:

CO—88%
$CO_2$—2%
$N_2$—6.5%
$H_2$—3%
$O_2$—0.5%

The apparatus shown in FIG. 1 was employed in this example.

Adsorption columns A and B contained 0.5 Kg of modified mordenite type zeolite activated at 350° C. In case of starting the apparatus, columns A and B were evacuated to 60 Torr by vacuum pump.

Valve 1 were opened, and dehumidified converter exhaust gas was continuously passed through column A and flow speed was adjusted so as to keep the pressure in column A at 1.0 $Kg/cm^2 \cdot G$, and valve 3 was opened. The adsorption was continued until breakthrough point of the adsorbent was almost reached. In the breakthrough point, concentration of the feed gas at inlet of column A became equal to that of the gas at exit of column A. In this point, valve 3 was closed and valve 5 was opened, whereby column A was connected to column B, and gas remaining in void in column A was introduced into column B until pressure in column A was reduced to one atmosphere. As a result, pressure in column B is increased from 60 Torr to 220 Torr. Then valve 5 was closed. Valves 3 and 7 were opened, column A was connected to product gas tank, poorly adsorbable component was purged. Then valves 3 and 7 are closed and valve 9 was opened, and easily adsorbable components CO and $CO_2$ was recovered by vacuum pump to 60 Torr. The recovered gas contained 4.8 Nl (95%) of CO, 0.3 Nl (4.7%) of $CO_2$ and 0.05 Nl (0.3%) of $N_2$. Feed gas was 11.07 Nl and yield was 26.3%.

EXAMPLE 2

This shows separation of CO from a mixture of 91.2% of CO and 8.8% of $N_2$. PSA cycle was repeated comprising adsorption-depressurization by pressure semi-equalization (concurrent)-purge (concurrent)-evacuation (countercurrent)-pressurization by pressure semi-equalization-pressurization by feed gas. Stainless steel adsorption column containing activated mordenite, a type of zeolite (0.5 Kg; ⅛ pellet) were employed. In case of starting the apparatus, columns were evacuated by vacuum pump to 60 Torr. Then the mixture gas (91.2% of CO and 8.8% of $N_2$) was continuously fed to column A (valve 1 was opened) at linear velocity of 2 $cm^2$/sec for 3 minutes and adjustment was made to keep pressure in column A at 1.0 $Kg/cm^2 \cdot G$. After valve 3 was opened, the mixture gas was continuously fed to column A until concentration of the mixture at inlet of column A became equal to that of the mixture at exit of zone A. About 13.5 Nl of the mixture gas was fed. Then valve 3 was closed and valve 5 was opened. Gas remaining void of column A (void in adsorbent) was introduced into column B. Pressure in column B was increased from 60 Torr to 220 Torr. When pressure of column A was reduced to one atmosphere, valve 5 was closed. Valves 3 and 7 were opened, and product gas (CO) was fed into column A by pressure of product gas tank, whereby gas in column A was purged. About 2.76 Nl of product gas was fed and about 2.69 Nl of gas purged from column A. When valves 3 and 7 were closed and valve 9 was opened, column A was evacuated by vacuum pump to 60 Torr to recover 6.85 Nl of product gas (CO). The resulting CO gas was higher than 99% pure. An amount of CO separated was 4.09 Nl. Yield was 33.1%. The purity of CO gas was confirmed by gas chromatography.

Adsorption conditions of Examples 1 and 2 are shown in Table 1.

TABLE 1

|  | Ex. 1 | Ex. 2 |
|---|---|---|
| Adsorption pressure $Kg/cm^2 \cdot G$ | 1 | 1 |
| Pressure after depressurization $Kg/cm^2 \cdot G$ | 0 | 0 |
| Evacuated pressure after desorption (Torr) | 60 | 60 |
| Amount of feed gas employed (Nl) | 11 | 13.15 |
| Amount of gas wasted during adsorption (Nl) | 6.2 | 6.37 |
| Amount of gas discharged during repressurization (Nl) | 1.7 | 1.8 |
| Amount of gas discharged during purge (Nl) | 2.6 | 2.69 |
| Amount of product (Nl) | 5.15 | 6.85 |

Table 2 shows the preferable time sequence by using two adsorptions according to this invention.

TABLE 2

| Cycle time (second) | Adsorption of column | |
|---|---|---|
| | Column A | Column B |
| 0–70 | ↓ evacuation | ↑ pressurization by ↑ feed gas (1 $Kg/cm^2 \cdot G$) |
| 70–120 | ↓ evacuation (60 Torr) | ↑ adsorption (1 $Kg/cm^2 \cdot G$) |
| 120–150 | ↑ pressurization (220 Torr by gas withdrawn ↑ from the other column | ↓ depressurization ↓ (0 $Kg/cm^2 \cdot G$) ↓ |
| 150–180 | ↑ pressurization (220 Torr by gas withdrawn ↑ from the other column | ↑ purge by product gas ↑ (pressure of bumb) ↑ |
| 180–250 | ↑ pressurization by ↑ feed gas (1 $Kg/cm^2 \cdot G$) | ↓ evacuation ↓ |
| 250–300 | ↑ adsorption | ↓ evacuation (60 Torr) |
| 300–330 | ↓ depressurization ↓ (0 $Kg/cm^2 \cdot G$) ↓ | ↑ pressurization (220 Torr) ↑ by gas withdrawn from ↑ the other column |
| 330–360 | ↑ purge by product gas ↑ ↑ | ↑ pressurization (220 Torr) ↑ by gas withdrawn from ↑ the other column |

Table 3 shows the step cycle by using four adsorption columns according to this invention.

TABLE 3

| | adsorption column A | adsorption column B | adsorption column C | adsorption column D |
|---|---|---|---|---|
| 1 | evacuation | pressurization by feed gas | depressurization | pressurization by gas withdrawn from the other column |
| 2 | " | adsorption | purge by product gas | pressurization by gas withdrawn from the other column |
| 3 | pressurization by gas withdrawn from the other column | depressurization | evacuation | pressurization by feed gas |
| 4 | pressurization by gas withdrawn from the other column | purge by product gas | " | adsorption |
| 5 | pressurization by feed gas | evacuation | pressurization by gas withdrawn from the other column | depressurization |
| 6 | adsorption | evacuation | pressurization by gas withdrawn from the other column | purge by product gas |
| 7 | depressurization | pressurization by gas withdrawn from | pressurization by feed gas | evacuation |

TABLE 3-continued

| | adsorption column A | adsorption column B | adsorption column C | adsorption column D |
|---|---|---|---|---|
| 8 | purge by feed gas | the other column pressurization by gas withdrawn from the other column | adsorption | " |

What is claimed is:

1. A process for separating carbon monoxide from a feed gas comprising carbon monoxide and nitrogen through pressure swing adsorption by using at least two adsorption columns containing an adsorbent exhibiting selective adsorb property to carbon monoxide which comprises:
  (i) a step of pressurizing an adsorption column by the feed gas, in which the step (vi) was previously completed;
  (ii) a step of introducing the feed gas into the adsorption column, in which step (i) was previously completed, so as to adsorb carbon monoxide on or in the adsorbent until the breakthrough point is reached or until just before that point is reached;
  (iii) a step of connecting the adsorption column, in which step (ii) was previously completed, to the other adsorption column in which step (v) was previously completed, to reduce the pressure in the former adsorption column to one atmosphere or a pressure close to it, and to increase pressure in the latter adsorption column;
  (iv) a step of purging nitrogen by passing product gas through the adsorption column, in which step (iii) was previously completed;
  (v) a step of desorbing carbon monoxide adsorbed on or in the adsorbent of the adsorption column, in which step (iv) was previously completed, by vacuum pump to recover a product gas, and
  (vi) a step of connecting the adsorption column, in which step (v) was previously completed, to the other adsorption column in which step (ii) was previously completed to increase pressure in the former column,
periodically switching the flow between or among said adsorption columns so as to repeat the above steps in all the adsorption columns.

2. The process according to claim 1 wherein the adsorption pressure is in the range of 0.1–3.0 Kg/cm$^2$·G.

3. The process according to claim 1 wherein depressurization by pressure equalization is countercurrently carried out.

4. The process according to claim 1 wherein purge by product gas is concurrently carried out.

5. The process according to claim 1 wherein the evacuation is countercurrently carried out.

6. The process according to claim 1 wherein pressurization by pressure equalization is concurrently carried out.

7. A process for separating carbon monoxide and carbon dioxide from a feed gas comprising carbon monoxide, carbon dioxide and nitrogen through pressure swing adsorption by using at least two adsorption columns containing an adsorbent exhibiting selective adsorb property to carbon monoxide and carbon dioxide which comprises:
  (i) a step of pressurizing an adsorption column by the feed gas, in which the step (vi) was previously completed;
  (ii) a step of introducing the feed gas into the adsorption column, in which step (i) was previously completed, so as to adsorb carbon monoxide and carbon dioxide adsorbed on or in the adsorbent until the breakthrough point is reached or until just before that point is reached;
  (iii) a step of connecting the adsorption column, in which step (ii) was previously completed, to the other adsorption column in which step (v) was previously completed, to reduce the pressure in the former adsorption column to one atmosphere or a pressure close to it, and to increase pressure in the latter column;
  (iv) a step of purging nitrogen by passing product gas through the adsorption column, in which step (iii) was previously completed;
  (v) a step of desorbing carbon monoxide and carbon dioxide on the adsorbent of the adsorption column, in which step (iv) was previously completed, by vacuum pump to recover a product gas, and
  (vi) a step of connecting the adsorption column, in which step (v) was previously completed, to the other adsorption column in which step (ii) was previously completed to increase pressure in the former column,
periodically switching the flow between or among said adsorption columns so as to repeat the above steps in all the adsorption columns.

8. The process according to claim 7 wherein the adsorption pressure is in the range of 0.1–3.0 Kg/cm$^2$·G.

9. The process according to claim 7 wherein depressurization by pressure equalization is countercurrently carried out.

10. The process according to claim 7 wherein purge by product gas is concurrently carried out.

11. The process according to claim 7 wherein the evacuation is countercurrently carried out.

12. The process according to claim 7 wherein pressurization by pressure equalization is concurrently carried out.

* * * * *